(12) United States Patent
Laviolette et al.

(10) Patent No.: US 6,779,134 B1
(45) Date of Patent: Aug. 17, 2004

(54) SOFTWARE TEST SYSTEM AND METHOD

(75) Inventors: Terry M. Laviolette, Courtice (CA); Ara Tatous, Los Altos, CA (US)

(73) Assignee: ATI International SRL, Christchurch (BB)

( * ) Notice: Subject to any disclaimer, the term of this patent is extended or adjusted under 35 U.S.C. 154(b) by 527 days.

(21) Appl. No.: 09/603,946

(22) Filed: Jun. 27, 2000

(51) Int. Cl.[7] .............................................. H02H 3/05
(52) U.S. Cl. ...................................................... 714/38
(58) Field of Search .............................. 714/38, 37, 39, 714/40; 717/100, 120, 121, 124, 128

(56) References Cited

U.S. PATENT DOCUMENTS

| | | | | |
|---|---|---|---|---|
| 5,371,883 A | * | 12/1994 | Gross et al. ................... | 714/38 |
| 5,742,754 A | * | 4/1998 | Tse .............................. | 714/38 |
| 6,014,760 A | * | 1/2000 | Silva et al. .................... | 714/46 |
| 6,167,537 A | * | 12/2000 | Silva et al. .................... | 714/46 |
| 6,360,268 B1 | * | 3/2002 | Silva et al. ................... | 709/227 |
| 6,543,047 B1 | * | 4/2003 | Vrhel et al. .................. | 717/121 |

* cited by examiner

Primary Examiner—Dieu-Minh Le
(74) Attorney, Agent, or Firm—Vedder, Price, Kaufman & Kammholz, P.C.

(57) ABSTRACT

A software test system and method detects a hardware configuration of each of plurality of test stations that are coupled to a processor such as a test center server. The software test system and method stores hardware configuration data representing the detected hardware configuration of each of the plurality of test stations and provides the hardware configuration data for use in determining which of the plurality of test stations is a suitable test station for testing target software to be tested. The test stations are dynamically configurable to contain and operate differing operating systems, test software, software to be tested and other suitable applications. A plurality of test stations coupled to a test center server each have different hardware configurations. The software test system and method provides selectability of test station configuration data such as selectable data including differing operating systems, different target software to be tested on at least one of the plurality of test stations and differing test software capable of testing the selected target software to be tested.

25 Claims, 6 Drawing Sheets

SOFTWARE TEST SYSTEM AND METHOD

RELATED CO-PENDING APPLICATION

This is a related application to copending application entitled Software Test System and Method with Memory Map Interprocess Communication filed on even date, by Laviolette et al, having Ser. No. 09/603,945, and owned by instant assignee.

FIELD OF THE INVENTION

The invention relates generally to methods and apparatus for testing software, and more particularly to methods and apparatus for testing software, such as drivers, on a plurality of different test stations having a different hardware configuration.

BACKGROUND OF THE INVENTION

Product testing has become an integral part of the success of products. Some products require both the testing of hardware and associated software. For example, in the field of graphic controllers, graphic processors have associated software drivers to suitably control operation of the graphics processor. Graphics processors are typically one of many components in a computer system or appliance which includes, for example, a host processor, system memory, operating system and other software applications. With the rapid changes in hardware configurations by differing manufacturers for computer systems and other data processing devices, and with the rapid development of differing software drivers for various hardware components, there is a need to test a software driver on computer systems having, for example, differing operating systems, hardware configurations, host processor speeds, and different applications to ensure that the software under test is operates properly in the proper environments prior to release.

Oftentimes, software and hardware testing is performed manually after an operator configures both the hardware and the software to be tested, to a set of required conditions. The test results often have to be manually analyzed to determine whether the test was successful and if not, which areas require further evaluation or interpretation. Moreover, where a group of computers are being used as a set of test stations, a limited type and number of software tests are performed on the fixed hardware configuration. Differing test stations such as desktop computers, may have differing hardware such as differing sized non-volatile and volatile memory, differing speed host processors, differing graphic processors, and other differing hardware.

Conventional software test systems typically do not provide detection of the type of hardware on a given test station among a plurality of test stations. In addition, if testing requires that a test station have a different operating system, the user typically has to manually load a new operating system on a given test station. Moreover, if another test is run on the same system, previous register settings can prevent a subsequent test from running properly. Also, where a plurality of different software has to be tested on differing hardware set ups with differing operating systems, the testing can take inordinate amounts of time and man hours. Test systems cannot typically determine the type of hardware in any given test station automatically to allow a user to choose which test station is more suitable for a given test.

Some conventional test software, such as Test Director, available from Innovative Software 1325 Borregas Ave, Sunnyvale Calif., 94089, provides automatic test analysis of test results to reduce the time necessary to determine whether or not software under test suitably performs on a given hardware environment and operating system. However, such test analysis software does not provide test system configuration capabilities, operating system selection or replacement capabilities, or other suitable test system capabilities that may improve software testing efficiency.

In addition, software imagers are known that cast an image (i.e., clone software) to a harddrive of a computer system. For example, a product known as Image Cast™, available from Innovative Software, 7040 North Port Washington Rd, Suite 410, Milwaukie, Wis., 53217 can allow a single server to clone multiple computer harddrives with the same image. However, no software test system is known which allows differing test stations under control of a common server to be configurable with different operating systems. Accordingly, conventional test systems cannot provide, among other things, user selectability of test station configuration wherein a group of test stations is associated with a given server.

In addition, it would be desirable to provide scalability of either user units, test centers or test stations to provide dynamic increasing of test capabilities by a plurality of test servers. The addition of additional test stations to a test center server should not interrupt the testing of other test stations associated with the test center server.

Component-based application development techniques are known, such as .dll files, breaks applications into dynamically loaded libraries. In addition, active X linking and embedding software is known which uses object-oriented software components to provide separate modules that can interact with one another. In addition, memory map file based interprocess communication techniques are known which provide a memory map file in volatile memory which can be accessed by other applications to provide control information and other information for use by a plurality of applications. However, such systems are not typically used in test system configurations.

Accordingly, a need exists for an improved software test system and method.

BRIEF DESCRIPTION OF THE DRAWINGS

The invention will be more readily understood with reference to the following drawings wherein.

DETAILED DESCRIPTION OF A PREFERRED EMBODIMENT OF THE INVENTION

Briefly, a software test system and method detects a hardware configuration of each of plurality of test stations that are coupled to a processor such as a test center server. The software test system and method stores hardware configuration data representing the detected hardware configuration of each of the plurality of test stations and provides the hardware configuration data for use in determining which of the plurality of test stations is a suitable test station for testing target software to be tested. The test stations are dynamically configurable to contain and operate differing operating systems, test software, software to be tested and other suitable applications. A plurality of test stations coupled to a test center server each have different hardware configurations.

The software test system and method provides selectability of test station configuration data such as selectable data including differing operating systems, different target software to be tested on at least one of the plurality of test stations and differing test software capable of testing the selected target software to be tested. A test job bundle is generated for use by the software test system. A test job bundle includes data representing, for example, at least one of a selected test station, a selected operating system for the selected test station, selected test software, and selected target software to be tested by a selected one of the plurality of test stations. The test job bundle may include a software test job that may perform software testing on a plurality of differing test stations that have a different hardware configuration. A test job bundle queue is maintained on a per test station basis to queue test jobs for each test station. The test job bundle also includes the test station configuration data so that the software test system and method configures, in response to the test job bundle, the selected test station defined by the test job bundle with, for example, a different operating system, different target software to be tested, and different test software for testing the software under test.

In one embodiment, another processor, such as a test system main server, is in operative communication with a plurality of test center servers wherein each of the test center servers controls a plurality of test stations. The test system main server may provide, for example, user log on determination, maintain system profile information, and provide a software imager to provide operating system images that are cloned onto hard drives of test stations in response to the configuration definitions set forth in the test job bundles. In one embodiment, each test station is reconfigured to a known state, such as by re-imaging the hard drive with an operating system and associated test software prior to each test being run, without a need for user intervention. The software to be tested is suitably installed on the appropriate test station without need for user intervention. All preselected tests are executed on a selected test station under control of, for example, the test center server, or other processor, without the need for user intervention. A user is capable of selecting, through a software user interface, a test station that is free to execute or schedule a job to be executed on a certain date/time. If at the scheduled date/time a higher priority job arrives for that specific test station the to be executed, the test job will be queued and managed by the test center server. Accordingly, a test system and method provides complete software reconfiguration of a test station to test software by means of remote and unattended user intervention.

Figure 1:
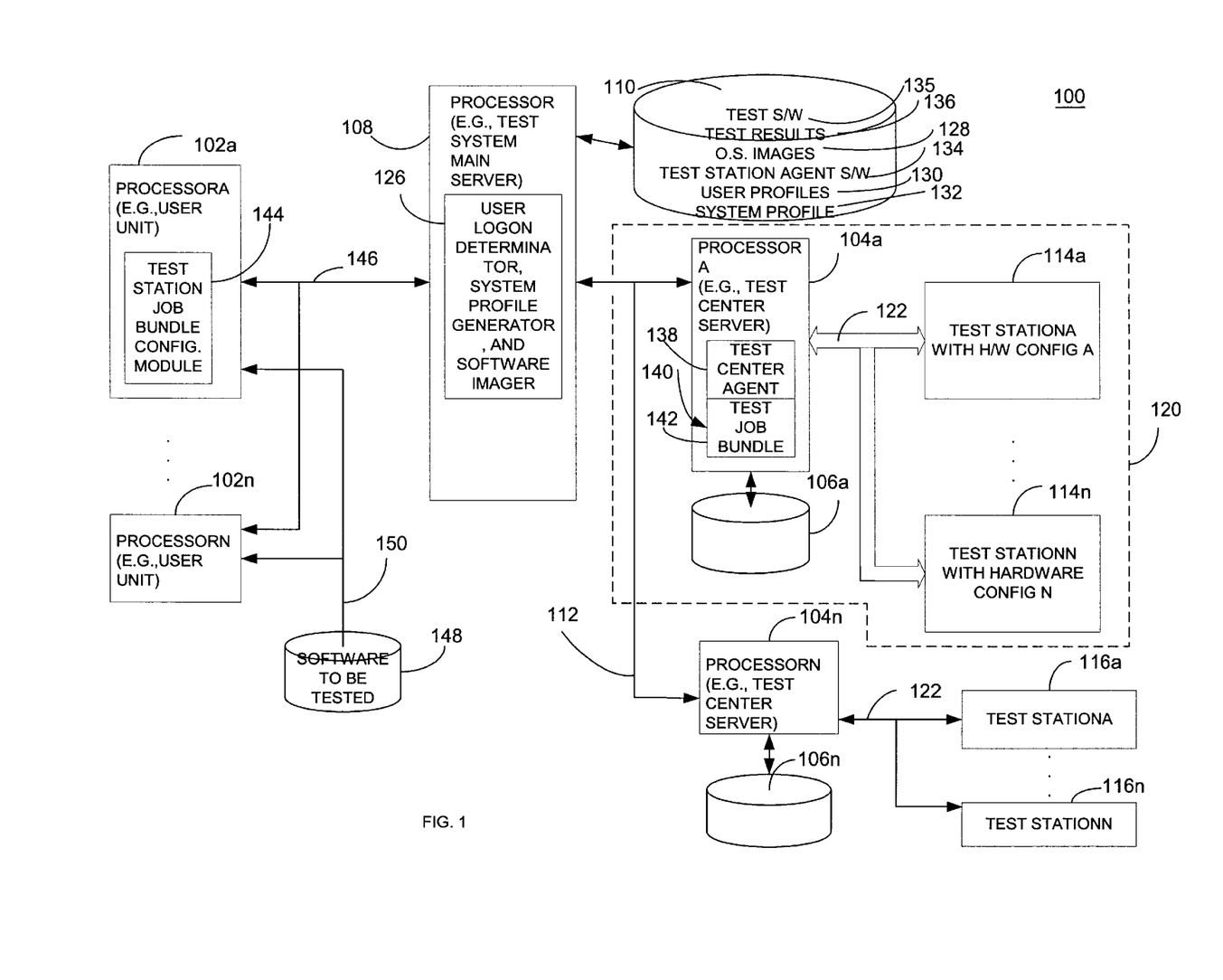
FIG. 1 is block diagram illustrating one example of a software test system in accordance with one embodiment of the invention.

FIG. 1 illustrates one example of a software test system 100 having a plurality of user units 102a–102n, such as a processor, computer node, portable processing device, or any other suitable processor. The software test system 100 also includes a plurality of processors such as test center servers 104a–104n that may be, for example, suitably programmed servers containing, or having access to, memory 106a–106n. Software test system 100 also includes another processor such as a test system main server 108 that includes associated memory 110 such as a suitable database or set of databases. The test system main server 108 maintains a communication link with all test center servers 104a–104n through a suitable communication link 112. The software test system 100 also includes a plurality of dynamically configurable software test stations 114a–114n associated with test center server 104a, and another group of dynamically configurable software test stations 116a–116n operatively coupled with test center server 104n. The test system main server 108 maintains communication indirectly with all test stations 114a–116n through the respective test center servers 104a–104n.

Each test center server 104a–104n serves as a type of master for the associated test stations 114a–114n, for example, which is largely responsible for managing the execution of all test stations assigned to the respective test center server. A test center 120 will be defined as a collection of test stations commonly accessed by a similar user type, such as a group of software engineers assigned to a particular test center. However, any user may be assigned to any test center server. It will be recognized that each test station 114a–116n can be logically assigned to a specific test center server without being mounted, for example, on a same physical test center configuration.

Each test station 114a–116n may be, for example, a desktop computer with a host processor, such as an Intel Pentium® type processor, or any other suitable test station configuration. In this example, each test station 114a–116n has a different hardware configuration. For example, test station 114a may have a different type of host processor, different speed clock and differing graphics processor cards than, for example, test station 114n. In this way, differing software drivers, or other software to be tested, can be tested on differing test environments. It will be recognized, however, that test stations may also have the same hardware configuration to allow a plurality of different users to perform tests on a same hardware configuration. Each of the test stations within a test center is in operative communication with an associated test center server through suitable communication link 122.

The test system main server 108 includes a plurality of software applications that serve as a user log in determinator, a system profile generator, and a software imager generally indicated as 126. The test system main server 108 maintains memory 110 with operating system images 128, user profiles 130, a system profile 132, a copy of test station agent software 134 and test results 136 obtained after testing is complete.

Each test center server 104a–104n also executes a software application that serves as a test center agent 138 and also includes a test job bundle request queue 140 containing test job bundles 142 for the test stations 114a–114n.

Each user unit includes a test station job bundle configuration module 144 that may be, for example, a software application, that creates the test job bundle 142. Each user unit 102a–102n is in operative communication with the test system main server 108 through a suitable communication link 146. In addition, each of the user units 102a–102n has access to memory 148, such as a database or other suitable storage element that contains a copy of the software to be tested indicated as 150. The software to be tested 150 may include, for example, a plurality of different drivers, .dll file, executables or other software, that need to be tested, for example, with different hardware configurations and different software configurations such as with different operating systems, different applications, (word processing applications, game applications, or any other suitable applications) that are to be executed on one or more selected configurable test stations 114a–116n.

It will be recognized that the software test system 100 may be suitably configured so that the memory 110, 148, 106a–106n, and any other suitable memory may be distributed databases, repositories, or a single database, or any other suitable configuration, as desired.

Figure 2:
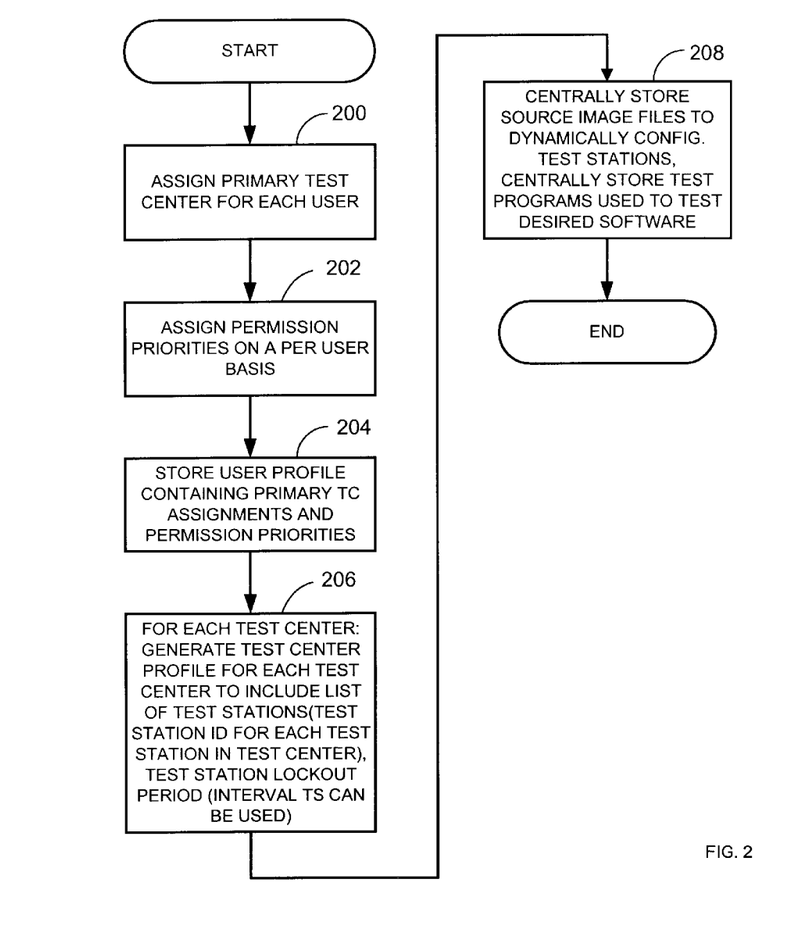
FIG. 2 is a flow chart illustrating one example of a method for setting up a software test system main server in accordance with one embodiment of the invention.
Figure 3:
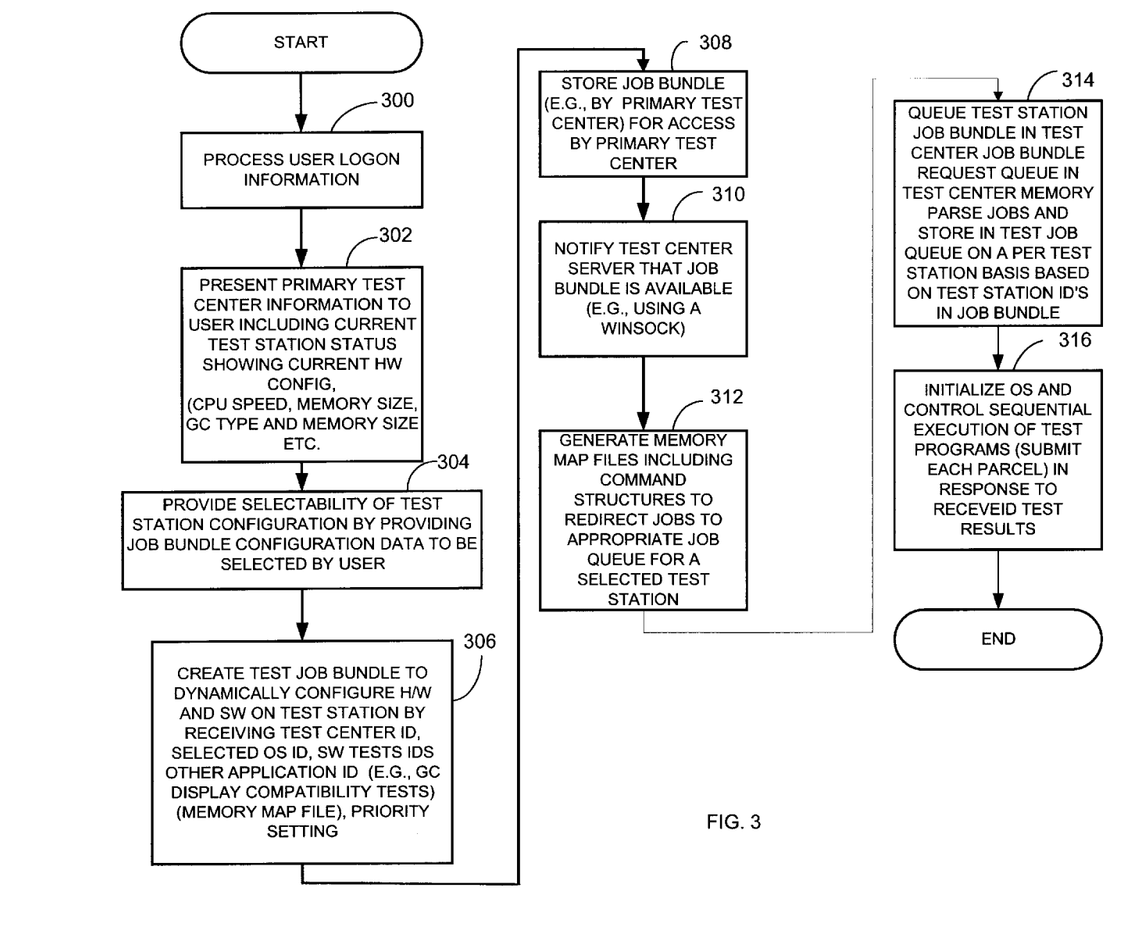
FIG. 3 is a flow chart illustrating one method of software testing in accordance with one embodiment of the invention.

Referring to FIGS. 2 and 3, a method for testing software using a test system that includes a test center server and a plurality of test stations will be described. As shown in block 200, the test system main server 108 prepares a user profile 130 based on selections made through a graphic user interface or any other suitable interface. For example, an administrator may assign a primary test center server for each of a plurality of users, shown in block 200. Accordingly, when a user logs on, the user has a preassigned primary test center from which corresponding test stations may be selected. However, it will be recognized that a user may select any test center server if necessary to carry out a test job.

As shown in block 202, the method includes assigning permission priorities on a per user basis. For example, this may also be done using a graphic user interface to continue the generation of the user profile 130 by assigning to a particular user a given priority level so that one type of user may have priority over other users so that when a high priority user selects a test to be run, and if lower priority users have already created test job bundles, a test center server may rearrange the test jobs based on the priority level of a user. As shown in block 204, the method includes storing the user profile 130, that contains the primary test center server assignments and permission priorities. As shown in block 206, the method also includes generating a system profile 132 which includes a test center server identifier (ID) and test station identifiers identifying each test station assigned to a given test center server. Each test station 114a–116n provides a current status of the hardware configuration to a test center server which then communicates the information to the test system main server. This hardware configuration status is then stored in the system profile so that at any given point in time, the test system main server has a snapshot of the hardware configurations of each test station in the system as well as which test stations are assigned to which test center servers and also which test stations are available for running tests. The system profile 132 may also include test station lockout period data which may be defined by an administrator through a graphic user interface so that a test station is locked out for a given period of time by a particular user if the user has high enough priority.

The method also includes, as shown in block 208, centrally storing source image files referred to as operating system images 128 (including any applications associated with the operating system as desired), test software 135, to dynamically configure test stations based on configuration data set by a user unit as defined in job bundles as later described. The operating system images may be a library of programs. Accordingly, the test system main server may include a software imager, such as a software program, such as Image Cast or any other suitable software imager, that can copy a source image such as one of the operating system images 128 and test software 135 on a given test station so that the selected test station is configured with a selected operating system and test software and any other software defined by a test job bundle. Accordingly, the memory 110 also includes test programs used to test the software to be tested 150.

FIG. 3 illustrates one example of a method for testing software carried out, for example, by the software test system 100. As shown in block 300, the method includes processing user log on information that is entered, for example through a graphic user interface through user unit 102a. For example, the test station job bundle configuration module 144 or any other suitable software application presents a log on screen for a user which then enters a user ID and associated password. The log on information is sent to the test system main server 108 which determines whether the user is suitably logged on based on the user profile information 130. Users log onto the main server and the user profile matrix defines which test center servers and therefore which test stations are available to the logged on user for job submissions. If the user has been granted access, the method includes presenting primary test center information for the logged on user through a suitable graphic user interface. This may include, for example, displaying a graphic representing the primary test center server that has been associated with the user along with icons representing each of the associated test stations, for example 114a–114n, and the current status, such as whether they are currently testing software or are free for immediate selection to run a software test. Accordingly, the method includes presenting the primary test center server information to a user which would include, for example, the current test station status, as well as, for example, showing the current hardware configuration of each test station. For example, the hardware configuration may include, displaying host processor speed, test station memory size, graphics controller type, graphics controller memory size, graphic controller type and manufacture, and any other suitable identifying information associated with the hardware on a per test station basis. This is shown in block 302.

The hardware configuration status of a test station is determined by, for example, a test station agent or software program which checks the properties of the hard drive or any other suitable hardware to determine the current hardware configuration. If, for example, the system operates a Windows-based operating system, the hardware configuration is obtained through suitable hardware property definitions available from the operating system. In addition, or alternatively, the system BIOS and the BIOS of all hardware cards may be sampled to extract the hardware status of the test station under control of the test station agent. This is done automatically by the test station agent 114 as soon as it is loaded. Upon executing, the test station agent periodically monitors the host system for both software and hardware configuration information and report this back to the test center server 104. The test system main server 108 then stores the hardware configuration data provided by the test station agent software as part of the system profile information 132. The hardware configuration data represents the detected hardware configuration of each of the plurality of test stations. As later described, in one embodiment, the test center server maintains a memory map file containing the hardware status of each test station under its control. The test system main server 108 may then suitably access the memory map file to determine the current hardware status that has been detected by a test station. The test station job bundle configuration module 144, or any other suitable software interface, provides the hardware configuration data to a user (such as described with reference to block 302). The hardware configuration data is provided for use in determining which of the plurality of test stations 114a–114n, for example, is a suitable test station for testing target software 150.

As shown in block 304, the method includes providing selectability of test station configuration data by providing selectable job bundle configuration data to be selected by a user through the test station job bundle configuration module 144. For example, a template is provided through a graphic user interface to a user as part of the test station job bundle module 144 operation. A user is given, for example, a list of differing operating systems that can be selectively loaded on one or more of the plurality of test stations. In addition, a user is presented with a selectable list of target software to be tested on one or more of a plurality of test stations. In addition, a graphic user interface lists differing test software capable of testing one of the selected target software to be tested. Accordingly, the test station job bundle configuration module 144 allows the user to define a software configuration for a specific test station by receiving selected data identifying which station to run the software test in view of its associated hardware configuration. In addition, the test station job bundle configuration module 144 presents a user with a field or any other suitable data input mechanism to schedule the test at a predefined time of day, if desired. In addition, the test station job bundle configuration module 144 also allows a user to define the test software to be loaded on a test station with the selected operating system so that the software to be tested can be run against the selected environment.

In one embodiment, the test job bundle configuration module assigns a different test station for a user in response to detection of test station unavailability associated with a desired test station hardware configuration selected by a user. The user selects the relevant hardware configuration information from the pick-lists provided by the test station job bundle configuration module 144. In this embodiment, the user would not choose which test stations 114 are to be selected for test execution. Following submission of the job bundle, the primary test center server 104 deterministically hands-off the job bundle to the test center servers 104a–104n that contain the test stations 114a–114n that match the unique hardware configurations required for test as selected by the user. This is achieved through a collaboration effort by both the test center server 104 and the test system main server 108.

If no test particular test station is selected, the system selects one for a user. The test job bundle configuration module 144 determines whether a selected hardware configuration has been chosen and determines whether a particular test station has been selected from the group associated with the primary test center. If no particular test station has been selected, the test job bundle configuration module compares the selected hardware configuration to hardware configuration data associated with a plurality of other test stations that are associated with different test center servers, and assigns a test station having a matching hardware configuration with the selected hardware configuration to the test job bundle.

Figure 4:
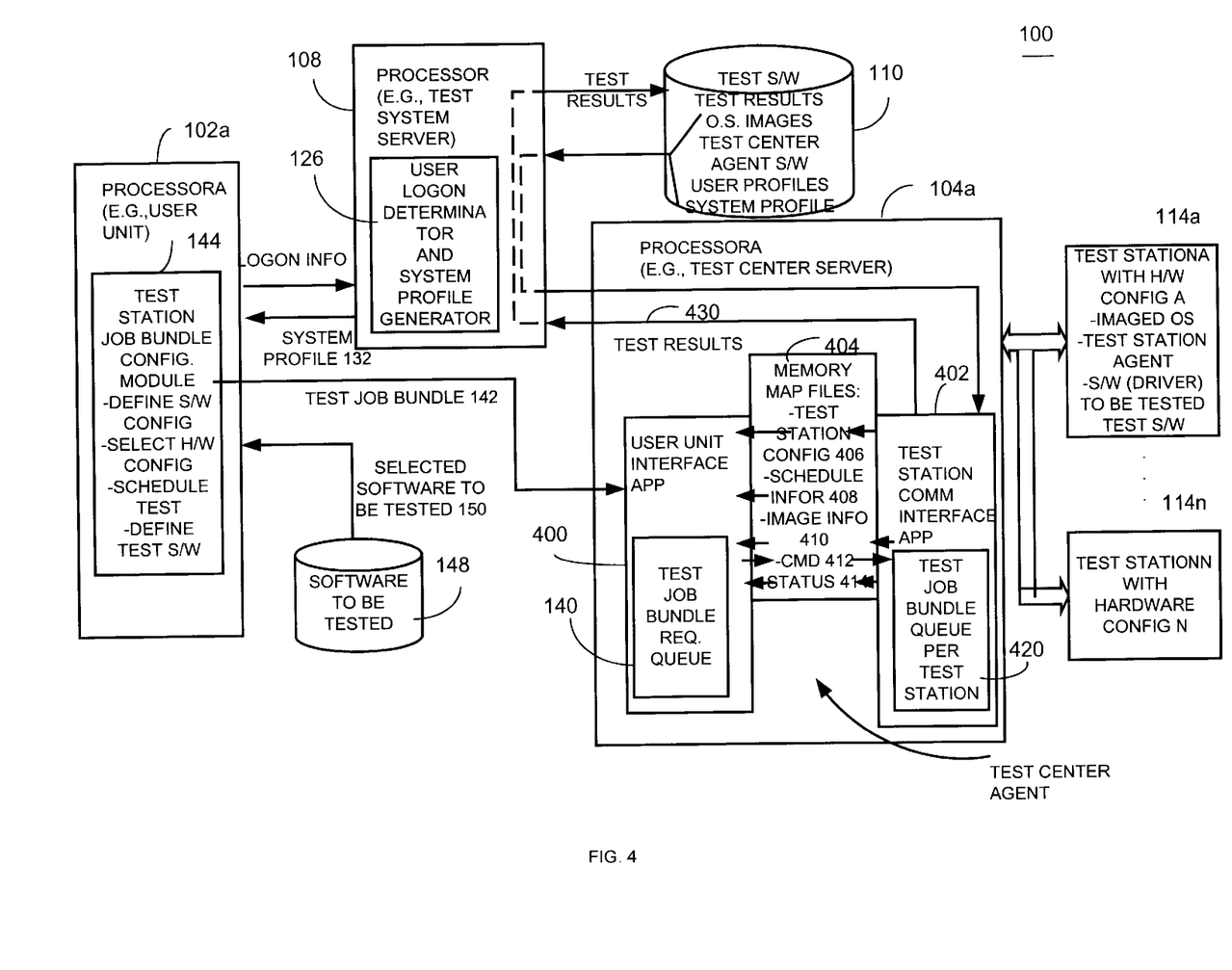
FIG. 4 is a block diagram illustrating in more detail one example of a software test system in accordance with one embodiment of the invention.
Figure 6:
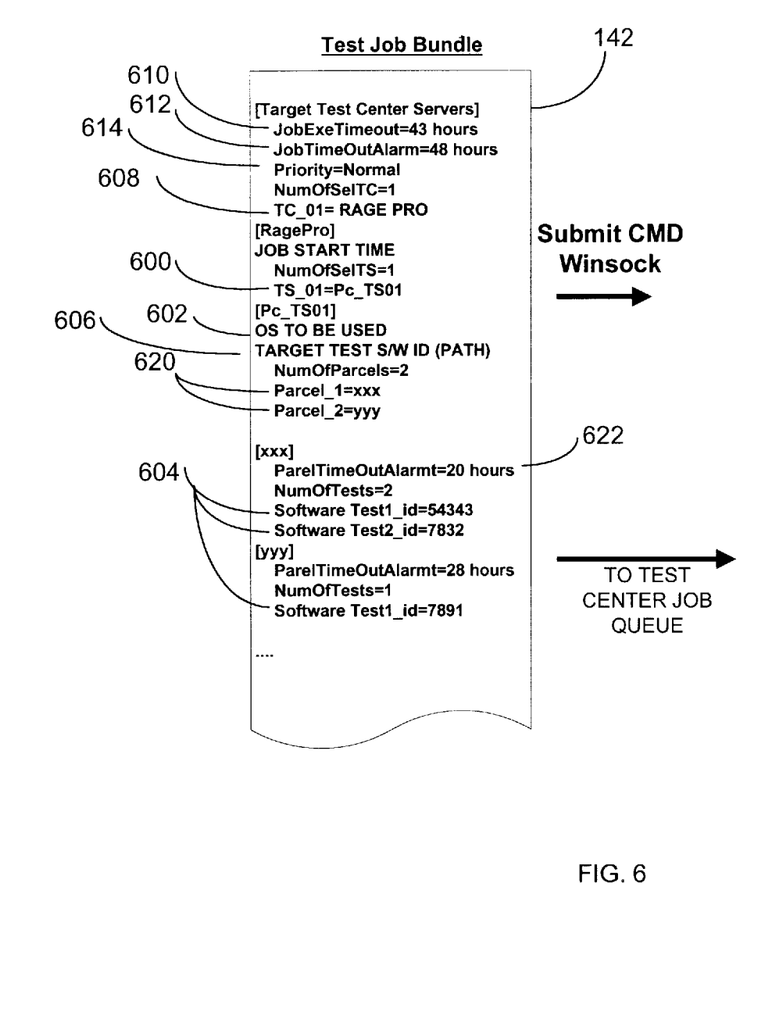
FIG. 6 is a graphic illustration of one example of a test job bundle in accordance with one embodiment of the invention.

Referring to FIGS. 3, 4 and 6, the method includes creating a test job bundle 142 (see FIG. 6), as shown in block 306, to dynamically configure hardware and software on a test station. The test station job bundle configuration module 144 creates the test job bundle 142, such as by using a suitable relational database, or any other suitable mechanism, so that the test job bundle 142 is a data structure that includes data representing at least one of a selected test station 600, a selected operating system 602, selected test software 604 and selected target software 606 to be tested on the selected test station 600. The target test software ID 606 and test software ID 604 may be, for example, test identification numbers, paths indicating where the software to be tested 150 and the test software 135 is stored so that it can be retrieved, or any other suitable identification information. Accordingly, the test job bundle 142 includes a test center identifier 608 indicating which test center will be responsible for the job (TC_01). The operating system to be used 602 can be identified by an operating system name, associated number, or any other suitable identifier. In addition, the test job bundle may include a job execution timeout period 610 representing the estimated time required to run the identified software test 604. Job timeout alarm data 612 may be set indicating a time period after which an alarm condition is registered if the tests are not properly completed within the timeout period (e.g., 48 hour). User priority data 614 indicates the priority level set by the user for the particular test job bundle. A number of selected test centers 614 is also indicated in the event that multiple test centers are selected for use in executing the identified test software 604. Also as shown, the test job bundle 142 may include a job start time 618, indicating a specified time when the user wishes the testing to begin.

In addition, the job bundle 142 may define a number of parcels 620 which is defined as a subset of tests to be executed with an associated parcel timeout period 622 (i.e., alarm time-out). A parcel does not include for example the operating system, software to be tested or hardware configuration information. That information is only required at the job bundle level. Upon receipt of the parcel by the test station, the test station agent discontinues communication with the test center server. This is done to ensure that no outside influences interfere with the test station environment once test execution has commenced. That said, the parcel alarm time-out flag is used by the test center server as a "lock out window" whereby the test center server does not expect any communication from the test station. However once the window has expired, i.e. the time-out flag is reached, the test station agent is expected to regain communication with the test center server. At this point the test center server sends the next job parcel of a same job bundle to the test station agent for execution. This process continues until all parcels have been executed. The use of parcels reduces the expected time to receive status regarding the tests being executed by the test station agent. Given that the entire set of tests within a job bundle may require upwards of 24 hours to execute, receiving status after this period of time is unacceptable from an efficiency perspective. Parcel time-outs reduce this status latency to the order of a few minutes or possibly few hours.

Referring back to FIG. 3, the method also includes storing the job bundle 142 by, for example, the test center server in a test job request queue 140 as shown in block 308. As shown in block 310, the method includes notifying the test center server that a job bundle is available, for example, through a Winsock command or any suitable command. It will be recognized that the storing of the job bundle may be done in response to submitting a command Winsock among applications such that the test station job bundle configuration module 144 provides a command Winsock for the test center agent 138 so that the test center agent suitably queues the test job bundle in the test center job request queue 140.

As shown in block 312, the method includes generating memory map files including command structures, such as commands consisting of: deploy image, status report, process job bundle, install driver and run test. As shown in FIG.

4, the test center agent 138 may be made up of two applications, namely a user unit interface application 400 and a test station communication interface application 402. A set of memory map files 404 are used to communicate information to and from the test center server with test stations, test system server and the user units. A test station hardware configuration memory map 406 includes the hardware configuration data detected by each of the test stations which is then provided for the test system server as part of the system profile. A schedule information memory map 408 includes data representing the schedule information for test job bundles based on the job start time information 618 in the job bundles. An image information memory map 410 includes a pointer to a selected operating system image and current version of software based on each test station and the test software being tested. A command memory map file 412 includes commands as populated by the various applications for suitable operation of communication among applications as known in the art. A status memory map 414 provides the current status of each test station. The test center server configures, in response to the test job bundle 142, the selected test station as defined by the test job bundle 142. For example, the test center server configures the selected test station by a software imaging process used by the software imager resident on the test system server to copy a source image to memory associated with the selected test station (e.g., such as imaging a hard drive of a test station) so that the selected test station is configured with a selected operating system and selected software to be tested as defined by the job bundle 142. Each job bundle is used to test one driver, or software module to be tested, but may consist of several tests to accomplish this goal.

The user unit interface application 400 is effectively a separate application from the test station communication interface application. The memory map files are used to control the test station communication interface application. The memory map files provide interprocess communication. The memory map interprocess communication mechanism allows modifications to occur to applications while others are allowed to continue to run so that software can be updated while still allowing testing to occur so that the system does not shut down. The user unit interface application submits jobs for the test station communication interface application and interfaces with the user units. The memory map files control the plurality of test stations to test software. The user interface application can be upgraded without shutting down the testing of software applications since the test station communication interface application 402 maintains the test job bundle queue 420 and the test center agents continue to operate while the user unit interface application is being upgraded, for example. Accordingly, software upgrades or other changes to the system need not interrupt software testing, which can greatly improve productivity. For example, the command memory map file contains commands for the test station agent such that the user unit interface application is replacable while at least one test station continues testing based on the command memory map file to avoid shut down of software testing when the user unit interface application is replaced.

Referring back to FIG. 3, as shown in block 314, the method for testing software includes queuing the test station job bundle in the test center job request bundle 140. In addition, the method includes parsing test job bundles from the test job bundles in the test center job request queue 140 to populate a test job bundle queue on a per test station basis wherein the per test station job queue is indicated as 420 (FIG. 4). Accordingly, another test job queue is created on a per test station basis based on test station IDs in each job bundle. In response to receiving the test job bundle, the user interface application checks a test station identified in the test job bundle to determine if it is ready to start a new software test based on the test job bundle; and if not ready, places the test job bundle in the test job bundle queue 420. As shown in block 316, the method includes initializing an operating system that has been imaged onto a particular test station, under control of the test station agent. The method includes maintaining a test job bundle queue on a per test station basis wherein the test job bundle queue includes a plurality of job bundles associated with a plurality of different job requests for the same test station.

The test center server controls sequential execution of a plurality of test software programs executed by a selected test station in response to receiving test results from the selected test station. For example, where a test station has been loaded with a plurality of test programs, each test is run sequentially and a subsequent test is not initiated until a previous test has provided test results back to the test center server for storage in memory 110. By way of example, the test center server sends a parcel to launch a test for the test station. The test station launches whatever is received in the parcel. The test station agent breaks communication with the test center server and launches the parcel to execute the test program. Once the test is complete, the test results are sent back to the test server where they are routed to the test system server for storage in memory 110. If test results are not received within the parcel timeout alarm period, an error condition is detected and the user is notified that the test did not run properly.

The method also includes routing copies of the test job bundle to a plurality of test center servers in response to test center server identification data in the test job bundle. For example, if a user selects test stations associated with differing test center servers in one job bundle, a copy of the job bundle is routed by the test station job bundle configuration module to the appropriate test center server. Accordingly, the test station job bundle configuration module 144 determines which test center servers need the job bundle based on the test center information 608 compared with the system profile information indicating which test centers include which test stations.

In a preferred embodiment, the method also includes reimaging memory, such as a hard drive or any other suitable memory, of the selected test station on a per test job bundle basis prior to executing each selected test software program identified in the test job bundle. For example, a new hard drive image is cast prior to the commencement of each job bundle. Accordingly, if a test job bundle queue 420 indicates that there are four jobs for a test station, that test station is reconfigured prior to the start of the job bundle so that when the test program operates, previous settings for the operating system and any other software applications do not corrupt the test.

As noted above, the test job bundle includes data identifying at least one of multiple test centers through the test center information 608, multiple test stations associated with a same test center or a different test center indicated as test station identification information 600, a plurality of different test software such as test 604, a plurality of different software to be tested such as the target test software ID information 606, a per job maximum time limit such as indicated at 610, a job start time 618 and a per test software maximum time limit 612.

Figure 5:
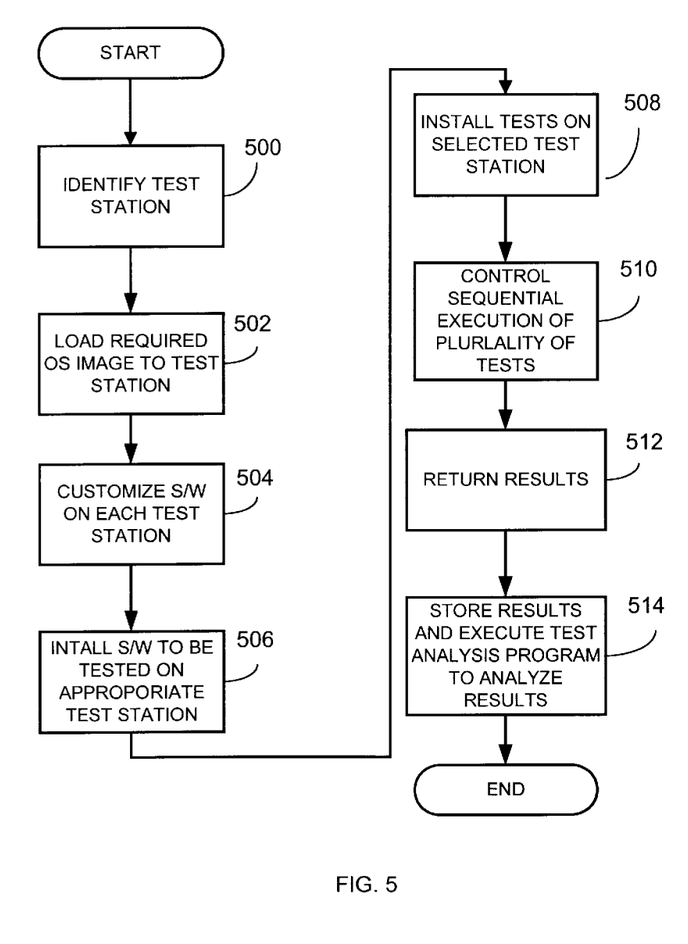
FIG. 5 is a flow chart illustrating one example of a method of operation for software testing from the perspective of a test center server in accordance with one embodiment of the invention.

Referring to FIGS. 4 and 5, the test center server 104a identifies a given test station to configure, as shown in block

500, based on the start time indicated in the job bundle. As shown in block 502, the test center server loads the required operating system image to the respective test station communication interface application which contains the information from the test system server based on the command memory map file. This information is in the operating system 602 information in the job bundle. When the user selects the operating system to be used as the software environment in which to run the tests, the name and explicit path to the chosen image are stored in the job bundle as the operating system information 602.

As shown in block 504, the method includes customizing the software on each test station by loading the required OS image onto the appropriate test station hard drive. As shown in block 506, the method includes installing the software to be tested on the appropriate test station, which is obtained from the memory 148 based on the path information in the test job bundle. As shown in block 508, the method includes installing the test on the selected test station that are used to test the software under test. The list of tests are stored in memory 110. As shown in block 510, the launch request is provided sequentially to the test station such that the test station agent launches a sequential parcel as provided by the test center server. As shown in block 512, the test station agent provides test results 430 back to the test center server for storage and later analysis. As shown in block 514, the method includes storing the test results and executing a test analysis program to analyze the test results. The launch of the test analysis program may be provided by the test system server 108 or any other suitable processor.

If a new test station is added to a test center server, the test center server adds the new test station in response to detection of access requests from the test station. Each test station 114a–114n has an associated unique post configuration file (PCF) that is loaded following the operating system imaging process. The test station agent 114 is an integral part of all operating system images. When the image process and post configuration process has completed the test station agent 114 will be automatically loaded. A portion of the "uniqueness" of the PCF includes the computer name. The test station agent 114 reports itself to the test center server 104 by its unique computer name which is compared by the test system server 108 to currently available test stations. If not listed as a currently available test station, it will be considered as a new addition to the test station database. For example, a new test station reports the presence of itself by publishing its name and relevant information on a known WinSock address which is monitored by the test center server reporter thread.

To obtain the current hardware configuration of a test station, the test center server 104 polls the test stations through a reporter thread dedicated in this case to test station hardware and software information. There are similar reporter threads for schedule information, image information, and other information. However, it will be recognized that any suitable communication scheme may be used.

The aforedescribed system provides a multi-user, multi-task software test system that allows each test station to run a different test and be configured with a different operating system if desired. The system provides automatic hardware detection and feedback to a user as well as automatic software configuration based on selected software configuration data. A priority queue is maintained so that jobs can be suitably prioritized based on priority levels assigned to a user or assigned to specific jobs. In addition, the system can dynamically reconfigure the operating system and other software on a test station.

The system provides a three-way level of scalability through the use of the memory map file configuration. For example, additional users can be added to the user profile while the test system is running tests by simply updating the user profile information. In addition, additional test center servers can be added by other servers are running by suitably populating the system profile. In addition, additional test stations can be added to a test center server automatically by the test center server polling the test stations periodically to determine any new additions and obtaining the current hardware configuration under control of the test station agent.

The test station communication interface application is multi-test station management software that provides test software to the test stations and serves as the per test station job queue manager. It manages the execution process on each test station in response to a given job bundle and the job bundle queue.

The above described software can be stored in one or more suitable storage mediums including but not limited to volatile memory, nonvolatile memory, optical storage devices or any other suitable storage devices. For example, memory may contain executable instructions that when executed by one or more processors, causes the one or more processors to provide memory map file based interprocess communication between the user unit interface application and the test station communication interface application to facilitate software testing by a plurality of networked test stations, and control the plurality of networked test stations to test software based on at least one memory map file. In addition, memory can contain executable instructions to provide the other operations described herein.

It should be understood that the implementation of other variations and modifications of the invention in its various aspects will be apparent to those of ordinary skill in the art, and that the invention is not limited by the specific embodiments described. For example, any operation performed by any application can be performed by any other application as desired. It is therefore contemplated to cover by the present invention, any and all modifications, variations, or equivalents that fall within the spirit and scope of the basic underlying principles disclosed and claimed herein.

What is claimed is:

1. A software test system comprising:
    at least one user unit operative to produce a test job bundle containing test station configuration information;
    at least one test center server operatively responsive to queue the test job bundle, obtain target software to be tested, and test software used to test the target software;
    a plurality of dynamically configurable software test stations, operatively coupled to the at least one test center server wherein a first test station has a first hardware configuration and wherein a second test station has a different hardware configuration; and
    a software imager, operatively coupled to the plurality of dynamically configurable software test stations, and operatively responsive to the test job bundle to copy a source image of an operating system or selected software to hard drive memory associated with a selected test station so that the selected test station is configured with a selected operating system and selected software to be tested as defined by the test job bundle.

2. The software test system of claim 1 wherein the at least one user unit includes at least one processing device operative to provide selectability of test station configuration data including selectability of:

differing operating systems for at least one of the plurality of test stations, differing target software to be tested on at least one of the plurality of test stations;

differing test software capable of testing at least one of a selected target software to be tested on at least one of the plurality of test stations; and creates the test job bundle that includes data representing at least one of: a selected test station, a selected operating system for the selected test station, selected test software, and selected target software to be tested on a selected one of the plurality of test stations.

3. The software test system of claim 2 wherein the processing device creates the test job bundle to include test station configuration information for a plurality of different test stations associated with a plurality of different test center servers and wherein the test center server reconfigures a plurality of test stations on a per test station basis in response to a plurality of test job bundles.

4. The software test system of claim 1 wherein the test job bundle further includes data identifying at least one of multiple test centers, multiple test stations associated with a same test center, multiple test stations associated with different test center servers, a plurality of different test software, a plurality of different software to be tested, a per job maximum time limit, a jobstart time and a per test software maximum time limit.

5. The software test system of claim 1 wherein the test center server maintains the test job bundle queue on a per test station basis wherein the test job bundle queue includes a plurality of job bundles associated with a plurality of different job requests.

6. The software test system of claim 1 wherein the test center server controls sequential execution of a plurality of test software programs executed by the selected test station in response to receiving test results from the selected test station.

7. The software test system of claim 1 wherein the client unit routes copies of the job bundle to a plurality of test center servers in response to test center server identification data in the test job bundle.

8. The software test system of claim 1 wherein the software imager causes reimaging of memory of a selected test station on a per test job bundle basis prior to executing a selected test software program identified in the test job bundle.

9. The software test system of claim 1 wherein the test center server compares a current status of operating system, and test software loaded on a selected test station with the selected operating system and test software in the test job bundle and avoids re-imaging of the test station if the current status is the same as the selected operating system and test software.

10. A method for testing software using a test system that includes at least a test center server and a plurality of test stations in operative communication with the test center server comprising steps of:

detecting a hardware configuration of each of the plurality of test stations;

storing hardware configuration data representing the detected hardware configuration of each of the plurality of test stations;

providing the hardware configuration data for use in determining which of the plurality of test stations is a suitable test station for testing target software to be tested;

providing selectability of test station configuration data including selectability of:

differing operating systems for at least one of the plurality of test stations, differing target software to be tested on at least one of the plurality of test stations;

differing test software capable of testing at least one of a selected target software to be tested on at least one of the plurality of test stations;

creating a test job bundle that includes data representing at least one of: a selected test station, a selected operating system for the selected test station, selected test software, and selected target software to be tested on a selected one of the plurality of test stations; and configuring, in response to the test job bundle, the selected test station by a software imaging process by copying a source image to memory associated with the selected test station so that the selected test station is configured with a selected operating system and selected software to be tested as defined by a test job bundle.

11. The method of claim 10 wherein the test job bundle includes test station configuration information for a plurality of different test stations associated with a plurality of different test center servers and wherein the step of configuring includes reconfiguring a plurality of test stations on a per test station basis in response to a plurality of test job bundles.

12. The method of claim 10 wherein the test job bundle further includes data identifying at least one of multiple test centers, multiple test stations associated with a same test center, multiple test stations associated with different test center servers, a plurality of different test software, a plurality of different software to be tested, a per job maximum time limit, a job start time and a per test software maximum time limit.

13. The method of claim 10 including the step of maintaining a test job bundle queue on a per test station basis wherein the test job bundle queue includes a plurality of job bundles associated with a plurality of different job requests.

14. The method of claim 13 wherein the test job bundle includes job priority data and wherein the method includes the step of queuing, in the test job bundle queue, test job bundles in the order of priority based on the job priority data in each test job bundle.

15. The method of claim 13 including the steps of:

in response to receiving the test job bundle, checking a test station identified in the test job bundle to determine if it is ready to start a new software test based on the test job bundle; and if not ready, placing the test job bundle in the test job bundle queue.

16. The method of claim 10 including the step of controlling sequential execution of a plurality of test software programs executed by the selected test station in response to receiving test results from the selected test station.

17. The method of claim 10 including the step of routing copies of the job bundle to a plurality of test center servers in response to test center server identification data in the test job bundle.

18. The method of claim 10 including the step of reimaging memory of a selected test station on a per test job bundle basis prior to executing a selected test software program identified in the test job bundle.

19. The method of claim 10 including the step of comparing a current status of operating system, and test software loaded on a selected test station with the selected operating system and test software in the test job bundle and avoid reimaging of the test station if the current status is the same as the selected operating system and test software.

20. The method of claim 10 wherein the step of detecting the hardware configuration of the test station includes detecting at least one of: a type of graphics processor, host processor to peripheral bus type, video memory size, type of video memory, and version of video bios.

21. The method of claim 10 including the step of assigning a test station in response to detection of test station unavailability associated with a first test center server by determining whether a test station associated with a second test center server meets the hardware configuration associated with a selected test station associated with the first test center station.

22. The method of claim 10 including the step of adding a test station to a test center server in response to receiving a unique identifier from the test station.

23. The method of claim 10 including the steps of:
determining whether a selected hardware configuration has been chosen;

determining whether a particular test station has been selected;

if no particular test station has been selected, comparing the selected hardware configuration to hardware configuration data associated with a plurality of test stations that are associated with different test center servers, and assigning a test station having a matching hardware configuration with the selected hardware configuration to the test job bundle.

24. The method of claim 10 including the step of centrally storing a plurality of operating system software and test software for use in configuring the selected test station.

25. The method of claim 10 including the step of centrally storing user profiles and test center server profiles for a plurality of test center servers, for use in test job bundle creation.

* * * * *